(12) United States Patent
Nguyen et al.

(10) Patent No.: US 10,237,441 B2
(45) Date of Patent: Mar. 19, 2019

(54) SYSTEM AND METHOD FOR MULTIFUNCTION PERIPHERAL DOCUMENT NOTARIZATION

(71) Applicants: Kabushiki Kaisha Toshiba, Minato-ku (JP); Toshiba TEC Kabushiki Kaisha, Shinagawa-ku (JP)

(72) Inventors: Christopher Nguyen, Huntington Beach, CA (US); Louis Ormond, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/466,049

(22) Filed: Mar. 22, 2017

(65) Prior Publication Data

US 2018/0278794 A1  Sep. 27, 2018

(51) Int. Cl.
*H04N 1/32* (2006.01)
*H04L 29/06* (2006.01)
*G06Q 50/18* (2012.01)
*H04N 1/44* (2006.01)

(52) U.S. Cl.
CPC ......... *H04N 1/32133* (2013.01); *G06Q 50/18* (2013.01); *H04L 63/0861* (2013.01); *H04N 1/442* (2013.01); *H04N 1/444* (2013.01); *H04N 2201/0094* (2013.01); *H04N 2201/3235* (2013.01)

(58) Field of Classification Search
CPC .... H04N 1/32133; H04N 1/442; H04N 1/444; H04N 2201/0094; H04N 2201/3235; G06Q 50/18; H04L 63/0861
USPC ....................................... 358/3.24, 1.15, 1.9
See application file for complete search history.

(56) References Cited

U.S. PATENT DOCUMENTS

| | | | |
|---|---|---|---|
| 9,531,707 B1 * | 12/2016 | Daniel | H04L 63/0861 |
| 2003/0177360 A1 * | 9/2003 | Carmichael | G06Q 10/10 713/176 |
| 2017/0357941 A1 * | 12/2017 | Best | G06Q 10/10 |

* cited by examiner

*Primary Examiner* — Quang N Vo
(74) *Attorney, Agent, or Firm* — Ulmer & Berne LLP

(57) ABSTRACT

A system and method for automated MFP notarization includes a display and a user input for receiving a notary request for document notarization. A device controller with processor and associated memory commences electronic notarization upon receipt of a notary request. A tangible document is scanned into electronic form under direction of the controller. The processor confirms acceptability of the electronic document relative to preset acceptance criteria and commences document verification when acceptability is confirmed. The user is prompted for execution of a verified document. User input corresponding to execution of the verified document is obtained and an electronic notarization is executed. A notarized electronic document comprised of the executed, electronic document inclusive of indicia corresponding to applied electronic notarization.

15 Claims, 4 Drawing Sheets

SYSTEM AND METHOD FOR MULTIFUNCTION PERIPHERAL DOCUMENT NOTARIZATION

TECHNICAL FIELD

This application relates generally to multifunction peripherals. The application relates more particularly automated document certification, such as automated notarization of documents.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

MFPs are typically provided with a fixed set of functions that are available to device end users. In addition to printing, copying, scanning and e-mailing, the device may add further options. Copying or printing may involve hole punching or stapling. Printing may be in black-and-white, or in color. Scanning may be to an image file or to a text-inclusive file via optical character recognition. These, and other options, are typically selectable by device users via a user interface, such as a touchscreen display integrated into an MFP.

While MFPs are powerful business tools, there are many document handling needs that are still performed by humans. Human interaction can add delay. For example, if a particular individual employee is needed, that person may be out of the office or busy with other, perhaps more pressing matters. If a needed person is not an employee, then an outside party must be brought in. This may require supervisory approval and can add further expense and delay. Even if a particular, outside individual has been pre-authorized and added expenses accounted for, that person too may be unavailable when needed.

SUMMARY

In accordance with an example embodiment, a system and method for automated MFP notarization includes a display and a user input for receiving a notary request for document notarization. A device controller with processor and associated memory commences electronic notarization upon receipt of a notary request. A tangible document is scanned into electronic form under direction of the controller. The processor confirms acceptability of the electronic document relative to preset acceptance criteria and commences document verification when acceptability is confirmed. The user is prompted for execution of a verified document. User input corresponding to execution of the verified document is obtained and an electronic notarization is executed. A notarized electronic document comprised of the executed, electronic document inclusive of indicia corresponding to applied electronic notarization is output.

In accordance with another example embodiment a system for cloud-based notarization includes a network interface and a processor and memory in data communication with a multifunction peripheral via the network interface. A memory stores a plurality of data verification records, each data verification record including stored biometric data corresponding to an associated user. A verification request, including biometric data, is received from the multifunction peripheral via the network interface. A comparison of received biometric data with stored biometric data is made, and a verification confirmation is made in accordance with a comparison of the received biometric data matches with stored biometric data. The processor to outputs a verification confirmation is sent to the multifunction peripheral via the network interface.

BRIEF DESCRIPTION OF THE DRAWINGS

Various embodiments will become better understood with regard to the following description, appended claims and accompanying drawings wherein:

DETAILED DESCRIPTION

Figure 1:
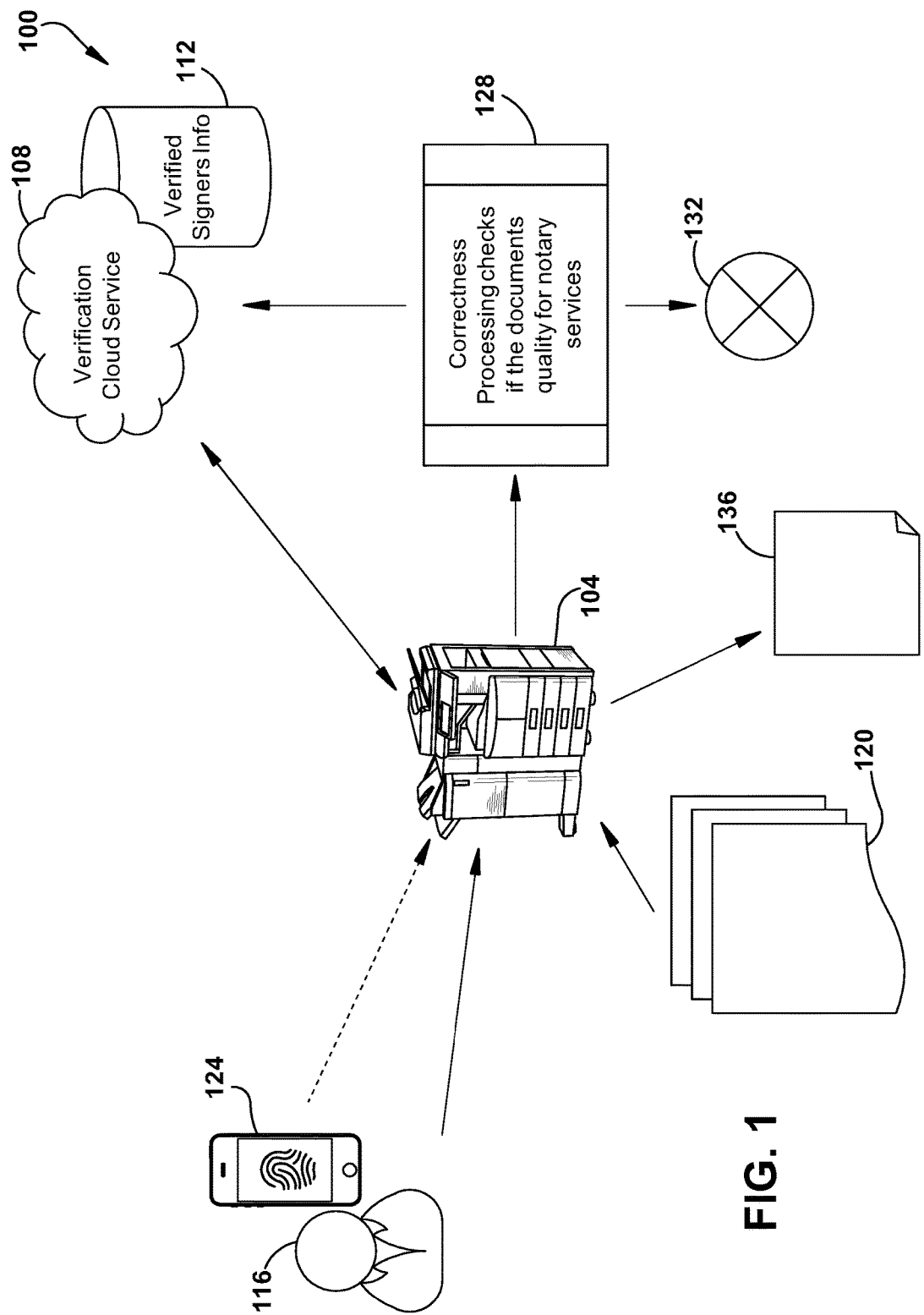
FIG. 1 an example embodiment of an automated notary service system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Among document-related functions that typically require human intervention, included is document notarization. Notarization ensures the authenticity of signatures that appear on legal documents. Example legal documents include affidavits, oaths, declarations, contracts, land deeds, wills or as transcripts of verbal statements, such as deposition or trial transcripts. Notarization is performed by a notary public, also known simply as a notary, defined as a public officer whose authority includes certifying writings to make them authentic. Only licensed individuals can serve as a notary. Qualification may include:

Completion and submission an application;
Receiving training from an approved education vendor;
Passing a state-administered exam;
Completing fingerprinting and a background check;
Receiving a commission certificate from the state;
Obtaining of a an optional surety bond;
Filing of commission paperwork with a state notary regulating official, such as a secretary of state, county recorder or other body;
Purchasing of necessary tools from a designated vendor, such as a notary stamp or seal, certificates, journal, guidebooks, etc.;
Payment of a fee; or
Purchasing of optional error and omissions insurance.

In addition to the forgoing, a notary term is typically limited. An individual may periodically need to renew their license. This may entail additional paperwork or additional training. In accordance with the forgoing, a relatively small percentage of people can act to notarize documents. While larger establishments may have one or more notaries on staff, this can be difficult for smaller concerns. As noted above, use of a notary can add delay and expense to documentation requiring notarization.

The subject application teaches an example embodiment wherein an MFP is empowered to notarize documents which may comprise tangible documents, such as paper, or intangible documents, such as electronic files, or both. As will be detailed below, a notary public service capability is embedded in an MFP. The application allows an end-user to scan in documents for notarization if a document is not already in electronic form. Once scanned in, the application cross checks the wording, formatting or content correctness. By way of example, a legal name may have to be properly placed and be used consistently throughout a document. Upon correctness satisfaction, the MFP will present verification and engage a signer. The signer will have pre-checked and qualified against a cloud service which has records of the signer's biometric fingerprints, retina scan or any other suitable biometric, such as voice print, facial characteristics, body characteristics, or the like. Biometric information is suitably obtained by input devices such as fingerprint scanners, retinal scanners or digital cameras. The signer is enabled to verify using a biometric scanning device or camera embedded in or attached to an MFP. Alternatively, the signer can verify using a portable data device, such as a smartphone that provides a communication link to the MFP. Direct communication links are advantageous as they are more secure. Example direct communication links are via BLUETOOTH, near field communication (NFC), optical path, or tethering. After verification of the signer, the MFP presents a statement that the signer must accept and sign. Once signed, the MFP creates a copy of the documents and places the appropriate Notary Public seal on the document, along with the signer's signature and a date/time stamp. The signer may have an option to allow the MFP to send the notarized documents to selected recipients electronically. Verification is suitably provided by a network or cloud based service. Use of a cloud based service may be advantageous, particularly in a situation wherein prior notary device certification may be required by a state or other political entity to be legally acceptable or enforceable.

Turning now to FIG. 1, illustrated is an example embodiment of an automated notary service system 100 that includes MFP 104. MFP 104 is in networked data communication with a verification cloud service 108. Cloud service 108 is accommodated on any suitable server platform. An associated data storage 112 includes data corresponding to a plurality of data verification records associated with a corresponding set of individuals that have been registered for automated MFP notarization. Each data record suitably includes user identification data corresponding to an individual, along with biometric data previously captured from that individual. As noted above, suitable biometric data may include one or more of scanned fingerprint data, scanned retina data, or any other suitable biometric, such as captured voice print data, facial characteristic data or body characteristic data captured from a digital camera, or the like.

In an automated notary service system 100 in the example embodiment of FIG. 1, an end user 116 commences notarization on MFP 104, suitably via an embedded or remote MFP user interface. Next, hard copy document 120, for which notarization is desired, is scanned into electronic form via a scanner/engine integrated with MFP 104. It is understood that, in the alternative, a digital document may be used and uploaded either directly to MFP 104, via a user device such as smartphone 124 via any suitable wireless or wired connection, or via a network connection, such as those detailed above. MFP 104 verifies correctness of the electronic version of document 120 by checking it against criteria 128 which may be local to MFP 104, or remotely served such as via cloud verification service 108. Documents that are not acceptable are rejected at 132. If correctness is verified, a suitable form 136 is provided via MFP 104 for user signature, either by printing of a page for signing/scanning, or via a display, such as a touch screen display for signing directly to a digital input.

Figure 2:
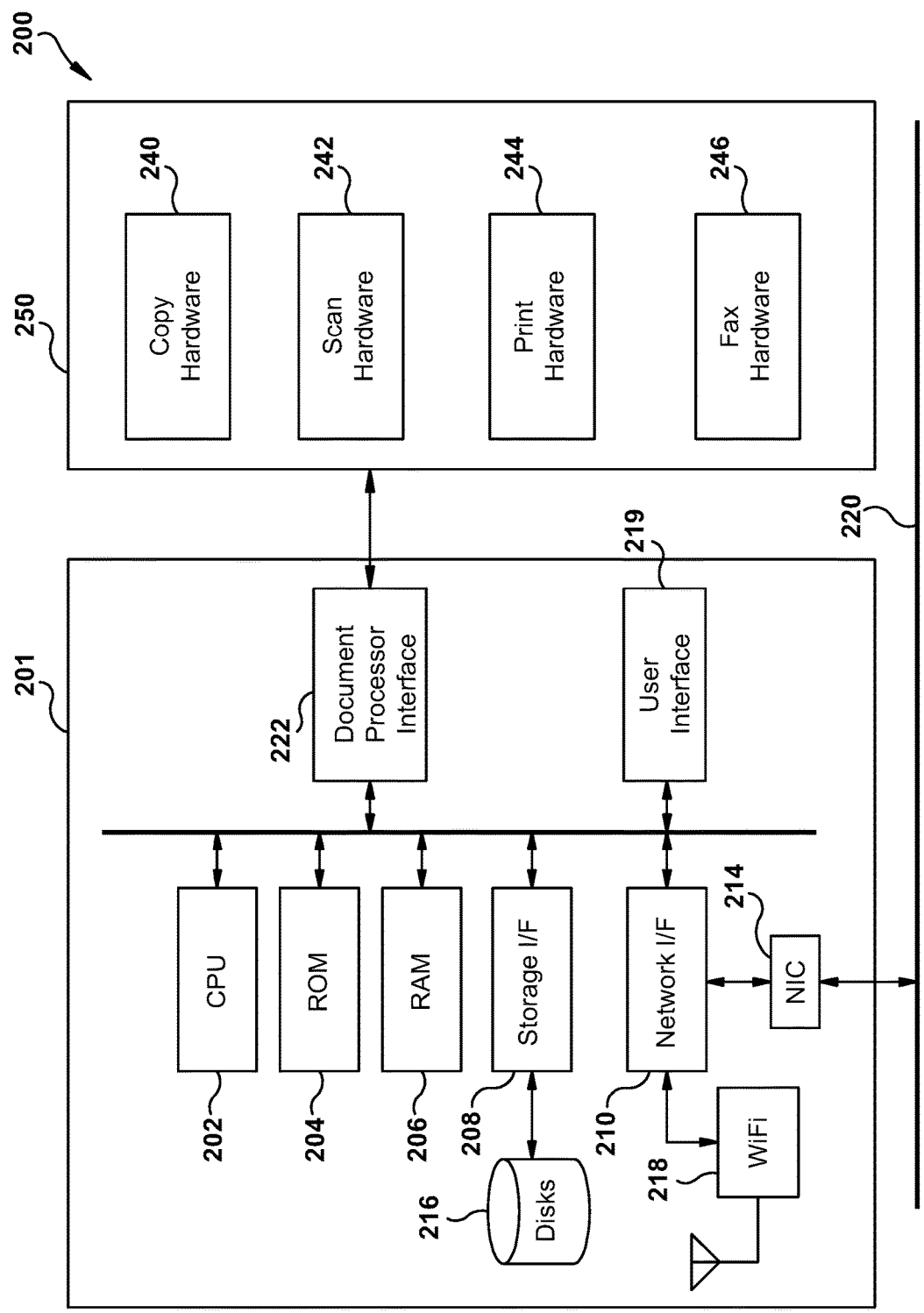
FIG. 2 is an example embodiment of a document rendering system.

Turning now to FIG. 2, illustrated are functional device components 200 suitably comprising a multifunctional peripheral such as MFP 104 of FIG. 1. Included is controller 201 comprised of one or more processors, such as that illustrated by processor 202. Each processor is suitably associated with non-volatile memory such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Apple Lightning, telephone line, or the like.

Processor 202 can also be in data communication with any suitable user input/output (I/O) interface 219 which provides data communication with user peripherals, such as displays, keyboards, mice, track balls, touch screens, or the like. Hardware monitor suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
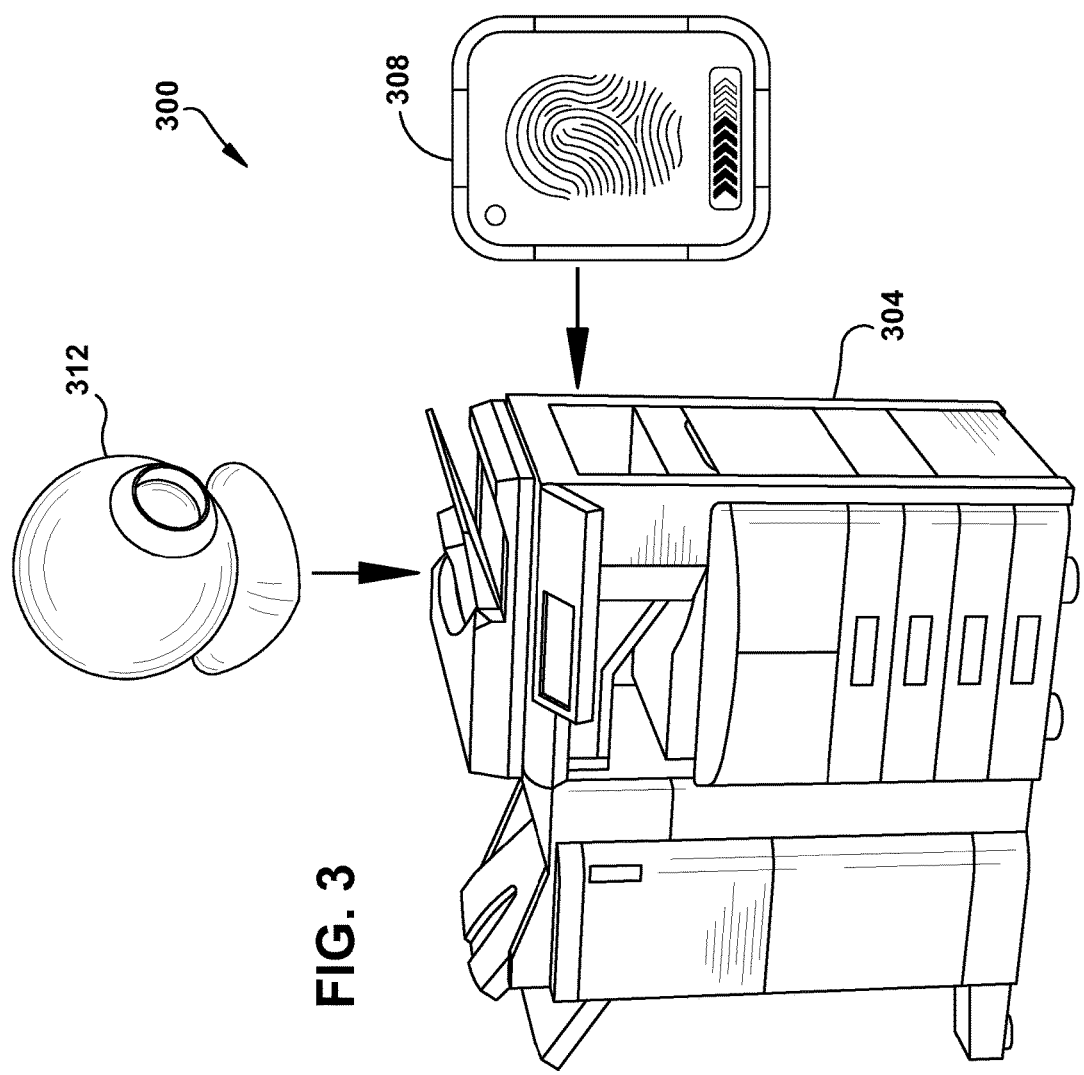
FIG. 3 is an example embodiment of a biometric input system.

Referring next to FIG. 3, illustrated is an example embodiment of a biometric input system 300 for use in connection with user verification for notarization as detailed above. Biometric information from a user is obtained by fingerprint scanner 308 or digital camera 312. MFP 304 may have an integrated fingerprint scanner or camera, or the same may suitably be added on, such as by USB connection. As noted above, a user's data device, such as smartphone, notebook computer or tablet computer may already have one or both of a fingerprint scanner or a camera, and can thus function to obtain biometric input from the user. In the subject example, captured biometric data is suitably encrypted for security prior to submission to a verification cloud service such as described above.

Figure 4:
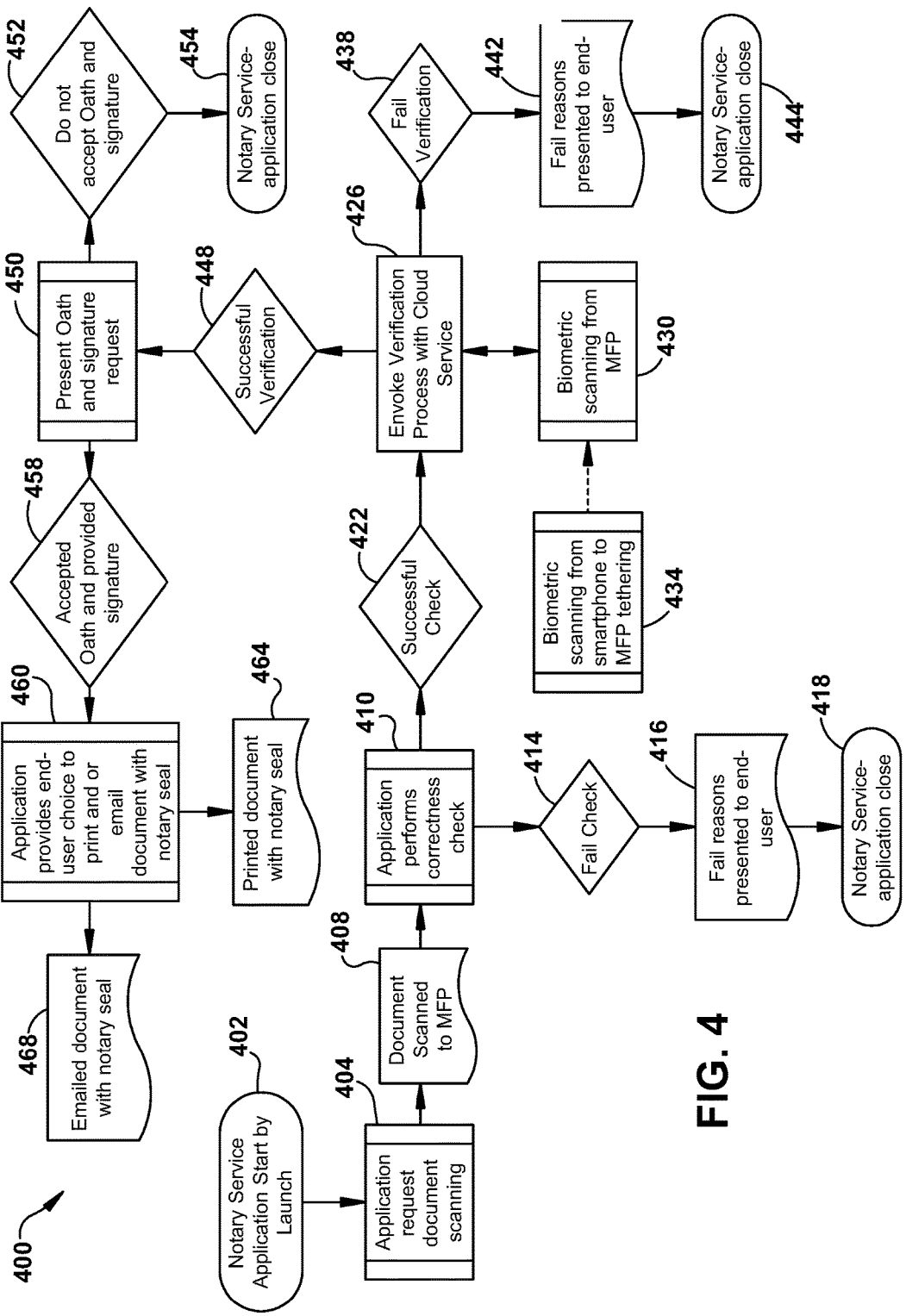
FIG. 4 is a flowchart of an example embodiment of automated notarization.

Turning next to FIG. 4, illustrated is a flowchart 400 of an example embodiment of automated notarization in connection with the forgoing. The process commences at block 402 when a user requests notary services via an equipped MFP. Documents in tangible form are solicited at block 404 and the document is scanned on the MFP at block 408. A correctness check of the electronic document is made at block 410. If a determination is made at block 414 that the document is not correct for notarization, then the reasons for failure are relayed to the user at block 416 and the processes terminates at block 418. If the electronic document is acceptable as determined at block 422, the verification is commenced via cloud service at block 426. Biometric information is solicited from the user and either obtained via the MFP itself at block 430, or via a portable device such as smartphone, either wirelessly or via wired connection, at block 434. If a cloud service fails to verify the user's biometric information at block 438, the reasons for verification failure are relayed to the user at block 442 and the process terminates at block 444.

If the cloud service successfully verifies the user's biometric information at block 448, a document for execution is generated, such as an electronic document on a touch-screen is displayed or a tangible document printed by the WI' at block 450. If the user's document execution is determined to be unacceptable at block 452, then the process terminates at block 454. If the user's document execution is determined to be successful at block 458, then the electronic document is watermarked as notarized at block 460, and printed with a notary seal at block 464 and/or e-mailed electronical with the watermarked notary seal at block 468.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
    a user interface including a display and a user input configured to receive a notary request for document notarization;
    a network interface:
    a device controller including processor and associated memory configured to commence electronic notarization upon receipt of a notary request; and
    a scanner configured to scan a tangible document into electronic form in accordance with instructions from the controller,
    wherein the scanner is further configured to receive a tangible document corresponding to the notary request and generate an electronic document corresponding thereto,
    wherein the processor is further configured to confirm legal acceptability of the electronic document relative to preset document content acceptance criteria stored in the memory,
    wherein the processor is further configured to commence document verification when acceptability is confirmed, in accordance with a biometric input and communication of data corresponding to the biometric input to an associated cloud service via the network interface,
    wherein the processor is further configured to receive a verification reply from the cloud service via the network interface,
    wherein the processor selectively verifies the electronic document in accordance with a received verification reply,
    wherein the processor is further configured to generate a prompt to a requesting user via the user interface for execution of a verified document,
    wherein the processor is further configured to receive user input corresponding to execution of the verified document,
    wherein the processor is further configured to apply electronic notarization to an executed, verified electronic document, and
    wherein the processor is further configured to output a notarized electronic document comprised of the executed, verified electronic document inclusive of indicia corresponding to applied electronic notarization.

2. The multifunction peripheral of claim 1 wherein the biometric input is comprised of one or more of iris scan input or fingerprint scan input received from the requesting user.

3. The multifunction peripheral of claim 2 further comprising a biometric scanner configured to receive the biometric input.

4. The multifunction peripheral of claim 2 further comprising:
    a portable device interface configured for data exchange with an associated portable data device, and
    wherein the portable device interface is further configured to receive the biometric input from the portable data device.

5. The multifunction peripheral of claim 4 further comprising a printer configured to print the notarized electronic document in accordance with instructions from the controller.

6. A method comprising:
    receiving a notary request for document notarization via a multifunction peripheral user interface;
    commencing, on a controller of the multifunction peripheral, an electronic notarization upon receipt of the notary request;
    receiving, into a scanner, a tangible document corresponding to the notary request;
    scanning the tangible document into electronic form, in accordance with instructions from the controller;
    confirming legal acceptability of the electronic document relative to preset document content acceptance criteria retrieved from memory by the controller;
    commencing document verification, in accordance with a biometric input and communication of data corresponding to the biometric input to an associated cloud service via a network interface, when acceptability is confirmed;
    receiving a verification reply from the cloud service via the network interface;
    verifying the electronic document in accordance with a received verification reply, generating a prompt to a requesting user via a user interface of the multifunction peripheral for execution of a verified document;
    receiving user input corresponding to execution of the verified document;
    applying electronic notarization to an executed, verified electronic document; and outputting a notarized electronic document comprised of the executed, verified electronic document inclusive of indicia corresponding to applied electronic notarization.

7. The method of claim 6 wherein the biometric input is comprised of one or more of iris scan input or fingerprint scan input received from the requesting user.

8. The method of claim 7 wherein a biometric scanner is configured to receive the biometric input in accordance with a biometric scanner of the multifunction peripheral.

9. The method of claim 7 further comprising: exchanging data with an associated portable data device via a portable device interface; and receiving the biometric input from the portable data device.

10. The method of claim 9 further comprising printing the notarized electronic document in accordance with instructions from the controller.

11. A system comprising:
a network interface;
a processor and memory in data communication with a multifunction peripheral via the network interface; and
a memory storing a plurality of data verification records, each data verification record including stored biometric data corresponding to an associated user, and
wherein the processor is configured to receive a verification request from the multifunction peripheral via the network interface, the verification request including biometric data,
wherein the processor is further configured to compare received biometric data with stored biometric data,
wherein the processor is further configured to generate a verification confirmation in accordance with a comparison of the received biometric data matches with stored biometric data,
wherein the processor is further configured to output to the multifunction peripheral, via the network interface, a response to the verification request in accordance with the verification confirmation,
wherein the processor is further configured to receive, via the network interface, an electronic document corresponding to the incoming biometric data from the multifunction peripheral,
wherein the memory is further configured to store correctness data corresponding to legal acceptability of content of an actable document for electronic notarization,
wherein the processor is further configured to examine a received electronic document relative to stored correctness data, and
wherein the processor is further configured to selectively process the received electronic document in accordance with the examined electronic document.

12. The system of claim 11 wherein each data verification record includes stored identity data corresponding to an identity of a corresponding user and wherein the processor is further configured to identify one of the plurality of data verification records in accordance with a match of biometric data in the record with received biometric data.

13. The system of claim 12 wherein the verification request includes user identification data associated with the received biometric, and
wherein the processor is further configured to compare received user identification data with stored identity data in an identified data verification record, and
wherein the processor is further configured to generate the verification confirmation in accordance with a comparison of the stored identity data of the identified data verification record and the identification data of the verification request.

14. The system of claim 12 wherein the memory is further configured to store device certification data, and
wherein the processor is further configured output request denial to the multifunction peripheral when the device certification data is not valid.

15. The system of claim 11 wherein the processor is further configured to communicate a rejection to the multifunction peripheral responsive to the verification request in accordance with examination of the received electronic document.

* * * * *